US009078797B2

(12) United States Patent
Shoenfeld

(10) Patent No.: US 9,078,797 B2
(45) Date of Patent: Jul. 14, 2015

(54) ANESTHESIA CART WITH KEYLESS ENTRY AND AUTOMATIC RE-LOCKING

(71) Applicant: Norman A. Shoenfeld, Cypress, TX (US)

(72) Inventor: Norman A. Shoenfeld, Cypress, TX (US)

(73) Assignee: S & S X-Ray Products, Inc., Penn Argyl, PA (US)

( * ) Notice: Subject to any disclaimer, the term of this patent is extended or adjusted under 35 U.S.C. 154(b) by 0 days.

(21) Appl. No.: 14/201,015

(22) Filed: Mar. 7, 2014

(65) Prior Publication Data

US 2014/0184038 A1 Jul. 3, 2014

Related U.S. Application Data

(63) Continuation-in-part of application No. 13/686,417, filed on Nov. 27, 2012.

(51) Int. Cl.

| | |
|---|---|
| ***G05B 19/00*** | (2006.01) |
| ***A61G 12/00*** | (2006.01) |
| ***E05B 17/22*** | (2006.01) |
| ***E05B 19/00*** | (2006.01) |
| ***E05B 65/46*** | (2006.01) |
| ***G07C 9/00*** | (2006.01) |

(52) U.S. Cl.

CPC .............. *A61G 12/001* (2013.01); *E05B 17/22* (2013.01); *E05B 19/0011* (2013.01); *E05B 65/46* (2013.01); *G07C 9/00111* (2013.01); *G07C 9/00912* (2013.01); *G07C 9/0069* (2013.01); *G07C 2209/08* (2013.01)

(58) Field of Classification Search

None

See application file for complete search history.

(56) References Cited

U.S. PATENT DOCUMENTS

| | | | | |
|---|---|---|---|---|
| 4,114,965 | A | 9/1978 | Oye et al. | |
| 8,092,426 | B2 | 1/2012 | Molnar | |
| 2003/0225596 | A1* | 12/2003 | Richardson et al. | 705/2 |
| 2005/0062238 | A1* | 3/2005 | Broadfield et al. | 280/1 |
| 2006/0087429 | A1* | 4/2006 | Snell et al. | 340/545.1 |
| 2007/0216517 | A1* | 9/2007 | Kurpinski et al. | 340/5.72 |
| 2011/0101018 | A1* | 5/2011 | Shafir | 221/1 |
| 2013/0006415 | A1* | 1/2013 | Paydar et al. | 700/235 |
| 2014/0104173 | A1* | 4/2014 | Bruno et al. | 345/168 |

OTHER PUBLICATIONS

Matbotix; Ultrasonic Range Finder—Matbotix LV-EZ1, SEN 00639 RoHS Compliant, Sparkfun Products, 2014.

* cited by examiner

*Primary Examiner* — Firmin Backer
*Assistant Examiner* — Brian Wilson
(74) *Attorney, Agent, or Firm* — Bernhard P. Molldrem, Jr.

(57) ABSTRACT

A controlled access anesthesia cart has at least one drawer or compartment for storing general-use anesthesia items, and at least one drawer or compartment for storing controlled substances, e.g., narcotics. A key card reader on the cart is sensitive to an authorization code to unlock the compartments in the cart for access. The anesthesiologist needs to enter a pass code for access to the controlled substances compartment(s). The compartments then remain unlocked so long as the anesthesiologist remains present. A sonic sensor, e.g., an ultrasonic rangefinder device, communicates with the computer of the cart, and when the anesthesiologist is outside a given beam volume in front of the cart, the cart automatically relocks the compartments either immediately or after a predetermined short delay period.

7 Claims, 3 Drawing Sheets

ANESTHESIA CART WITH KEYLESS ENTRY AND AUTOMATIC RE-LOCKING

This is a continuation-in-part of my co-pending patent application Ser. No. 13/686,417, filed Nov. 27, 2012.

BACKGROUND OF THE INVENTION

This invention relates to cabinets for storing and dispensing prescription medical items, and is more particularly concerned with a cart or rolling cabinet which can be wheeled into a surgical room and which can provide an anesthesiologist with full access to the contents, but can also provide security in respect to narcotics and other controlled materials contained in the cart. Importantly, the invention is also directed to an anesthesia cart which has the ability to lock automatically when the anesthesiologist is not present, e.g., when the anesthesiologist walks away from the cart.

Medications, including narcotics, sedatives, and other controlled substances, are routinely used by an anesthesiologist in the operating room. These substances need to be freely available to the anesthesiologist in an emergency situation where time is of the essence. At the same time, because these controlled substances have high potential for abuse, the compartments that contain these substances have to be secured and locked at any time the anesthesiologist is not present. These two goals are mutually contradictory, where the need to keep these substances secure and locked up interferes with the need to make the materials fully available in an emergency.

The anesthesia carts and other medications carts currently available typically involve a mechanical lock that has to be physically unlocked to obtain access to the contents. These carts need a physical key to unlock the compartments to obtain access. This can be a detriment to the objective of free access if the key cannot be found for some reason, and can be a detriment to security of the controlled materials if the user forgets to re-lock the cart. Also, the key access system does not allow for obtaining the identification of the person opening the cart. Those carts also lack the capability for a sophisticated audit trail, so that it is not possible to determine or record who it was that accessed the cart, when it was opened, when it was locked, and what item(s) have been removed from the cart or cabinet.

Some cabinets and carts permit electronic locking and unlocking, and have the capability of maintaining an audit trail of access. However, these carts depend for security of the contents on the user's affirmative input to lock the cart, or a timer that automatically sets to relock the cart after some fixed time period (e.g., ten minutes) after the cart is accessed and opened or unlocked. The deficiency of the former system is that if the user forgets or neglects to re-lock the cart, then the cart does not secure the contents. The deficiency of the latter system is that the cart may automatically re-lock during a surgical procedure, locking the anesthesiologist out, and delaying the access to emergency drugs, as they become at least temporarily unavailable pending re-logging into the cart and re-entering the anesthesiologist's access or PIN number. The use of an access card may assist in reducing the time needed to re-log in, but even then reaching for the card and swiping it in the cart can waste valuable time in an emergency, and as for narcotics or other controlled materials, security requirements mean that an additional password or code would still need to be entered to resume access.

OBJECTS AND SUMMARY OF THE INVENTION

Accordingly, it is an object of the present invention to provide an anesthesiology cart or similar medical dispensing arrangement that avoids the drawbacks of the prior art.

It is another object to provide an anesthesia cart with a controlled materials compartment in the form, e.g., of one or more pull-out drawers, divided into individual compartments, and each with a locking lid or cover, to limit authorized access to a narcotic or syringe containing a controlled substance, and with access to the locking compartments being limited to the attending anesthesiologist, but permitting access for the duration of the time that the anesthesiologist is actually present. Of course, as used in this description and claims, the term "drawer" should be read broadly to cover any equivalent compartment that can be electrically locked and unlocked.

The anesthesia cart of this invention may be based on a medication cart equipped with electronically locking drawers/bins, and operated by a personal computer (PC) or microprocessor board, and a coded entry device or sensor for anesthesiologist authorized ID. The cart may also include a proximity type sensor to serve the role (or part of that role) of the RFID antenna of my co-pending application Ser. No. 13/686,417. The cart may be powered by 110V or 220V AC power, with battery backup, e.g., an uninterruptible power supply or UPS, or alternatively by battery power, with or without the use of a battery charging circuit. In addition to a PC and monitor, the cart may also include a barcode or RFID scanner to identify medications being removed, and may include suitable software permitting it to maintain a current inventory.

In a favorable embodiment, an ultrasonic proximity sensor is mounted on the cart, preferably towards the rear of the cart and facing forward towards the front of the cart. The ultrasonic sensor turns on when the cart is opened or unlocked, and monitors the presence of the anesthesiologist or anesthesiology nurse or technician within a given range of the front of the cart. The ultrasonic proximity sensor, which can be implemented as an ultrasonic range finder, senses the distance between the cart (or cabinet) and the user. So long as the user remains within a pre-programmed distance from the front of the cart (e.g., about eighteen inches from the front of the cart) the cart remains open and unlocked. If the user is not sensed to be within the pre-programmed distance, e.g., producing a drop in output voltage of the sensor, the cart software will commence a lock-down, and lock the cart. A time delay (e.g., between 5 seconds and 60 seconds) can be employed between loss of sensor signal and lock-down of the cart, where the anesthesiologist, anesthesiology nurse, or other user is not always in front of the cart.

The use and operation of the anesthesiology cart is as follows—when the anesthesiologist approaches the medication cart, the active transponder or other key card that he is carrying (typically, the size of a credit card) is swiped near the RFID sensor of the cart, and the drawers containing non-controlled substances are opened automatically. Manual entry of a narcotics password into the system allows access to the entire contents of the cart (this is done to prevent access to the controlled substances within the cart by someone without authorized access but who happens to find the key card). The cart remains fully unlocked at all times when the anesthesiologist remains within the range of the ultrasonic sensor. When the anesthesiologist leaves the vicinity of the cart, the signal from the sensor changes, and the cart automatically locks without any further user input. A brief time delay may be interposed between the user going out of sensor range and lock-down. A full audit trail is recorded by the cart, which includes the listing of drawers or bins that have been opened in the cart, and may also include a list of items removed from the cart, when a barcode scanner or RFID scanner is included with the system.

In an alternate configuration, there may be two (or more) levels of access to the cart, determined by the key card assigned to the user:

For lower-level access, the anesthesia technician's key card may have an key code which only allows access to the non-controlled substances and supplies in the cart, all of which may be opened when the technician is in the vicinity of the cart.

For higher-level access, the anesthesiologist's key card may have an key code which allows full access to everything on the cart, and allows all drawers/bins including the narcotics drawers to be opened and remain open while in the vicinity of the cart. This system also requires the entry of an additional password to access the controlled substances in the cart, or may be alternatively be programmed to omit the need for this additional password.

In either event, the cart remains open for access to the authorized materials while the user is present, but will re-lock automatically when the user walks away, beyond the predetermined range of the ultrasonic sensor.

Thus, the advantages of this anesthesia cart are:

a.) Quicker access to items in the cart without the need to enter a login name or take out a proximity card;

b.) Automatically relocking the cart without user input;

c.) An audit trail is automatically created, identifying the users and when they had access and what they had access to; and d.) There is no need for a timed relock of the cart, which can be a safety issue in the middle of a long operation.

Key card readers or sensors within carts in a specific hospital or on a specific floor can all be programmed to accept the specific codes assigned to the individual doctors in the OR, or assigned to the individual nurses on a floor. This programming can be done remotely over a wireless or wired network, or through the use of software contained on the cart or using a USB or wireless input on the cart. The readers or sensors may include voice recognition, biometric sensors, or any of many other devices onto which the authorized user can enter identity information to obtain access.

In accordance with an aspect of the present invention, the anesthesia cart has a cabinet with a base, a top, and casters or rollers mounted on the base of the cabinet to permit the cabinet to be rolled. A computer control arrangement is mounted on the cabinet and includes a computer processor, a keyboard, a fixed reader or transceiver mounted in the cabinet with the latter being coupled to the computer processor At least one general use drawer (or equivalent compartment) in the cabinet has an electro-mechanical lock coupled to the computer processor, and at least one controlled-materials drawer (or equivalent locking compartment) in the cabinet has one or more lockable compartments with an electro-mechanical lock mechanism for locking and unlocking the one or more lockable compartments.

A coded swipe card or proximity card or device (an active transceiver carried by e.g., the anesthesiologist or in some cases by the anesthesiology technician or nurse) is capable of communicating an anesthesia authorization code to a reader or transceiver in the cart. The transceiver or reader cooperates with the computer control arrangement to communicate with the electro-mechanical lock mechanism of the general use drawer and to communicate with the electro-mechanical lock mechanism of the one or more lockable compartments, and respond to the presence of the anesthesia authorization code to unlock the at least one general use drawer to permit access to such drawer. Where an anesthesia narcotic access code is required, the computer is programmed to await entry of a required authorized pass code on the keyboard or touch-screen. Then, upon entry of the authorized pass code the lockable compartments in the controlled-materials drawer are unlocked to allow the anaesthesiologist full access to the contents.

An ultrasonic sensor, e.g., an ultrasonic range finder, centered left-to-right on the cart, senses presence of the user when the user is within a pre-programmed range, such as within about eighteen inches of the front of the cart, and within a given beam angle of the sensor.

Upon loss of signal of the ultrasonic range finder or similar sensor, the cabinet re-locks the general use drawer(s) and re-locks the lockable compartments of the controlled materials drawer. If desired, there may be a pre-programmed time delay after loss of sensor signal to allow the ultrasonic sensor to re-gain the presence of the user before the time delay period expires, so that the cart will remain open.

The controlled materials drawer may be of a design that includes a pull out drawer slidably supported in the cabinet, with the drawer having a number of storage compartments arranged in at least one row in a given direction across the drawer and an elongated channel portion extending in the same given direction alongside the row of compartments. Each of those storage compartments has a locking lid that is normally locked down but is selectively releasable to permit the lid to open for access to the compartment. In a favorable design, a slide bar disposed in the channel portion is adapted to move for at least a limited distance along the channel portion, and is arranged to slide to one or more unlock positions to unlock the respective ones of the compartment lids. A controlled gearmotor moves the slide bar to the appropriate positions to permit the lid to be lifted open but may lock each of the other compartment lids in said row from opening. This drawer may operate on the principles generally presented in my earlier-filed, co-pending patent application Ser. No. 13/291,462, filed Nov. 8, 2011, and the disclosure in which is incorporated herein by reference.

The principles of this invention are not to be limited only to an anesthesia cart of the type described in the preferred embodiment, and the cart or cabinet need not always include a locked drawer or compartment for narcotics or similar controlled substances. The automatic locking and unlocking feature may also be applied to a cart or cabinet for storing patient medications or medical supply items at a nursing station or elsewhere on a nursing floor. In that case, a nurse (carrying an appropriately coded device) walking up to the cabinet or cart can unlock the cart for use, but the cart or cabinet will automatically re-lock as soon as the nurse walks away beyond the predetermined range of the ultrasonic sensor.

The above and many other objects, features, and advantages of this invention will become apparent from the ensuing description of a selected preferred embodiment, which is to be considered in connection with the accompanying Drawing.

DETAILED DESCRIPTION OF THE PREFERRED EMBODIMENT

Figure 1:
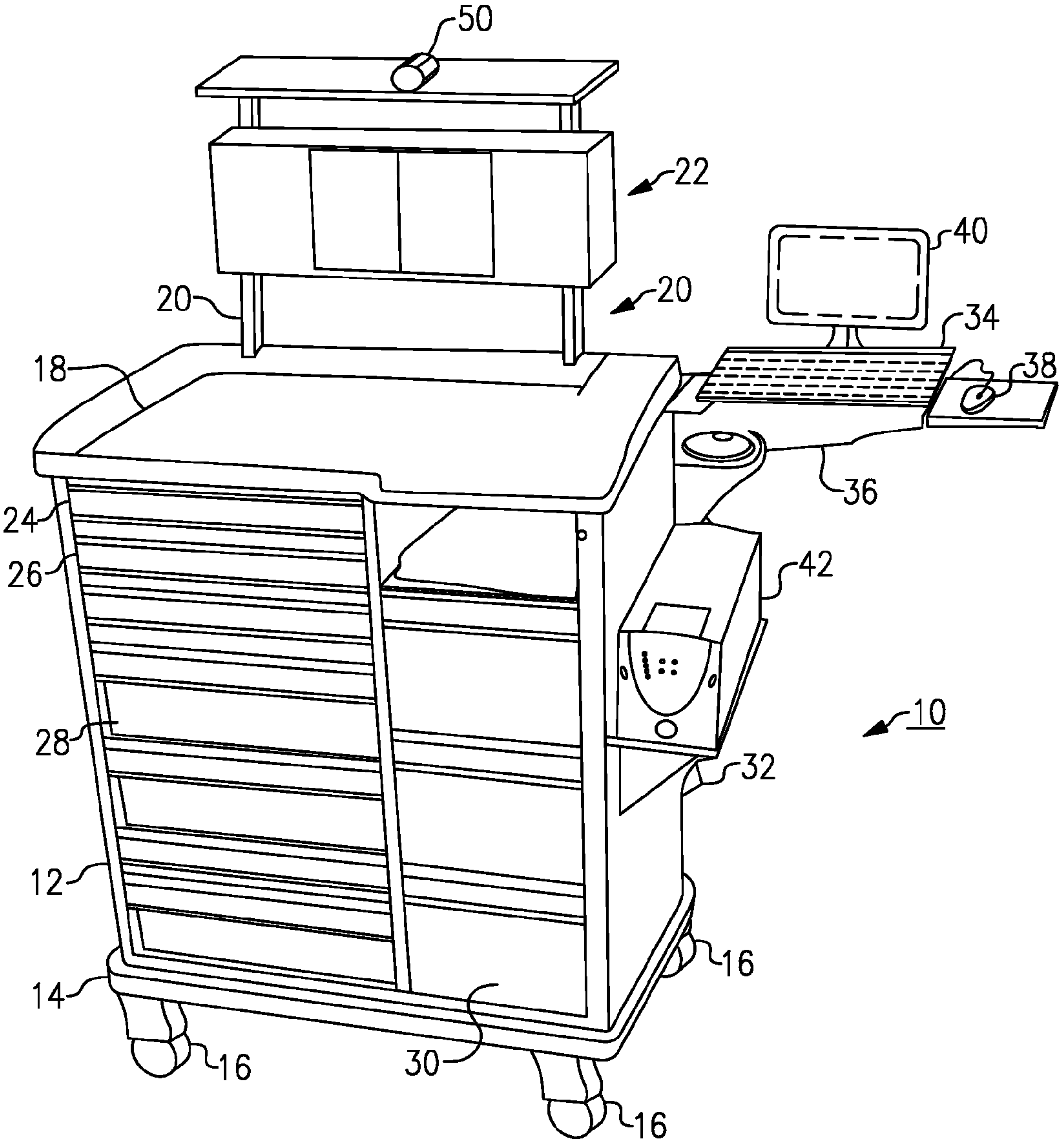
FIG. 1 is a perspective view of an anesthesia cart according to one embodiment of the present invention.

With reference to the Drawing, and initially to FIG. 1, an anesthesia cart 10 is configured so as to be able to be rolled easily into an operating room. The cart can contain various items and materials that will be needed or may be needed by the attending anesthesiologist during a patient surgical procedure. In this case, the cart 10 is a free-standing cabinet with a frame 12, and a base 14 on which there are mounted casters or rollers 16, here with five-inch wheels for smooth low-resistance rolling. The wheels may be locked once the cart is positioned in the operating room. The cart 10 also has a generally flat top 18 that can serve as a work surface for the anesthesiologist. At the rear of the top 18 are vertical rails 20 on which bins 22 are mounted for holding some items. Usually, these do not contain controlled items and do not have locking compartments. The upper part of the rails 20 and a top shelf are omitted in this view.

The frame 12 of the cart also supports a number of locking slide-out drawers, including a top slide-out drawer 24, here configured as a lockable bin compartment or LBC drawer, which in this embodiment is used for holding controlled materials, e.g., narcotics, for which strict access limits are needed.

There are also additional locking drawers including pull-out drawers 26 of generally the same dimension as drawer 24 and somewhat deeper drawers 28, all aligned in a stack on the left side of the cart 10, plus a stack of larger pull-out bins 30. These drawers 26, 28 and 30 can be general-use anesthesia drawers and bins that are intended for materials with a lower need for security than the materials in the drawer 24. These bins are normally kept locked, but are unlocked when the anesthesiologist, carrying a suitably encoded key card, approaches the cart 10 and swipes the key card. The top drawer 24, i.e., the narcotics drawer, requires the anesthesiologist to enter an access code or PIN to unlock. A key-operated lock may be located on the cart and can serve as a pharmacy over-ride or emergency override.

In one version of the anesthesia cart, there can be two drawers that are LBC drawers, for controlled substances, plus another drawer used for storage of prepared syringes, which may also contain controlled substances. Entry of the pass code enables access to all three drawers, and any bin in the LBC drawer can be selected to open.

A computer unit, i.e., a PC 32 is mounted on the back of the cart 10 (here only a corner of the PC is visible) and is connected with an associated keyboard 34, supported on a shelf 36 on the right side of the cart 10, on which a mouse device 38 is also present, and to a display or monitor 40. The keyboard serves as a data entry device for an authorized person to enter a pass code when needed. Data could be entered in other ways, e.g., on a touch-screen of the monitor 40. An uninterruptible power supply 42 is also supported on a shelf on the right side of the cart 10, and serves as a battery backup for the electronics on the cart 10 including the computer 32 and its peripherals, as well as for the electro-mechanical drawer locks and latches (not shown) within the cart. The power cord for connecting with the hospital AC power is not shown here. Also, mounted within the cart 10 is an RFID reader or swipe card reader that is connected with the computer 32.

Figure 2:
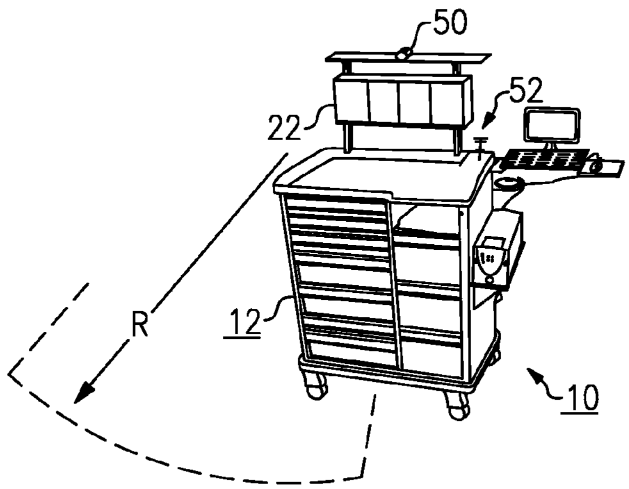
FIG. 2 is a schematic view for explaining the novel operation of the cart of this invention.

As shown somewhat schematically in FIG. 2, when the cart 10 is located in the operating room, an attending anesthesiologist carries a portable active key card, i.e., proximity card, about the size of a standard credit card, and the cart may include a corresponding proximity card reader 52 past which the card may be swiped. The computer 32 is programmed so as to unlock the drawers 24, 26 etc. when the code from the proximity card or key card is detected. As a result the cart 10 opens when the anesthesiologist presents the appropriate key code. The cart will remain open and unlocked as long as the anesthesiologist is present in the operating room in front of the cart and in range of a presence sensor, e.g. an ultrasonic range-finder sensor 50, as will now be described.

The ultrasonic range finder or similar ultrasonic sensor 50 is mounted on the cabinet, midway across, and has a beam angle or aperture, and is oriented directly ahead so that the beam is directed forward and is centered in the direction facing past the front of the cart, with sufficient width so that it can sense a user present immediately in front of the cart, e.g., within about eighteen inches of the cart. This distance may be adjusted as desired. The ultrasonic rangefinder or sensor 50 can detect distances between a few inches and several feet, and provides either a digital output signal or an analog output signal (i.e., voltage level) that is sent to the computer 32. The computer is programmed so that when the user leaves, i.e., is outside the pre-programmed range or outside the beam of the sensor 50, the cart will automatically relock (subject to an optional time delay).

As mentioned earlier, one or more of the drawers, e.g., drawer 24 is configured for holding narcotics and other materials that need to be safeguarded, but which also need to be freely available to the anesthesiologist during the entire patient procedure, and must be accessible by him or her without delay.

Figure 3:
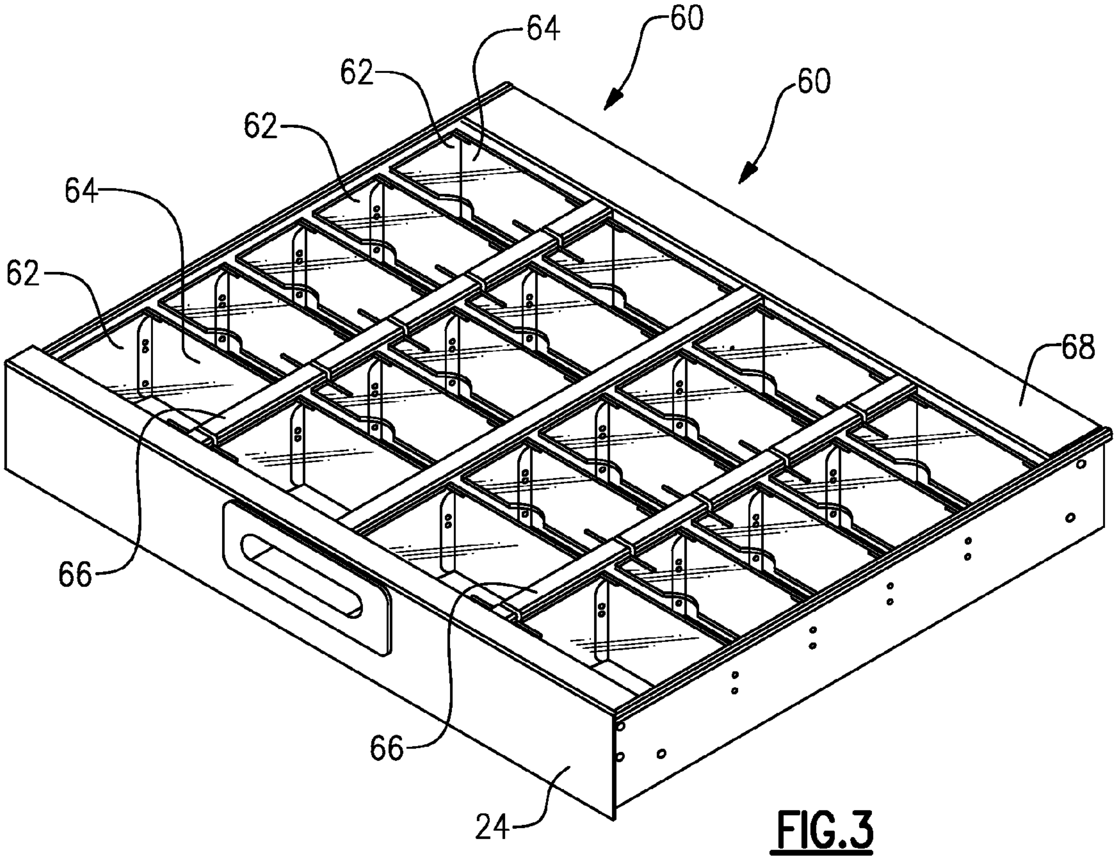
FIG. 3 is a perspective view of a controlled-materials drawer used for containing narcotics and other materials that need to be securely handled, as employed in this embodiment.

In this embodiment the drawer 24, as shown in FIG. 3, has a number of rows 60 of compartments or bins 62, with each bin 62 having a respective locking lid 64, which can swing upward to open the bin when the lid 64 is unlocked. Between the rows 60 of bins are covered channels 68, which each contain a linear sliding bar (not shown) which is moved by means of a servo motor (not shown) that is positioned in a motor compartment 68 at the distal end of the drawer 24. Details about the construction and operation of the locking bins of this drawer 24 are contained in my co-pending U.S. patent application Ser. No. 13/291,462, filed Nov. 8, 2011, the contents of which is incorporated by reference herein.

In order to unlock these bins so as to be able to access their contents, the anesthesiologist has to enter a pass code or PIN either on the keyboard 34 or on the monitor 40—if the monitor is an active-screen or touch-screen monitor. Then, once unlocked, the anesthesiologist can access any of the bins or compartments 62, so long as he or she remains present in the operating room, i.e., within the range R of the transceiver 50. If the anesthesiologist leaves the operating room, the cart automatically re-locks, including re-locking the compartments 62 in this drawer 24. Upon return of the anesthesiologist, the cart will again automatically unlock, but the anesthesiologist needs to re-enter the pass code in order to access items in the drawer 24.

The dimensions of the drawer 24 and of the respective compartments 62 may be different from what is shown in this example.

This arrangement may have database control over the exact locations of the medications and supplies. Bar coding and/or RFID coding of the medications or other contents of the cart permit the access to those materials to be recorded and tracked, both as to the person accessing them, and the time of access. Similarly, methods employing RFID identification of individual medications can also be used for security and prevention of medication dispensing errors.

Figure 4:
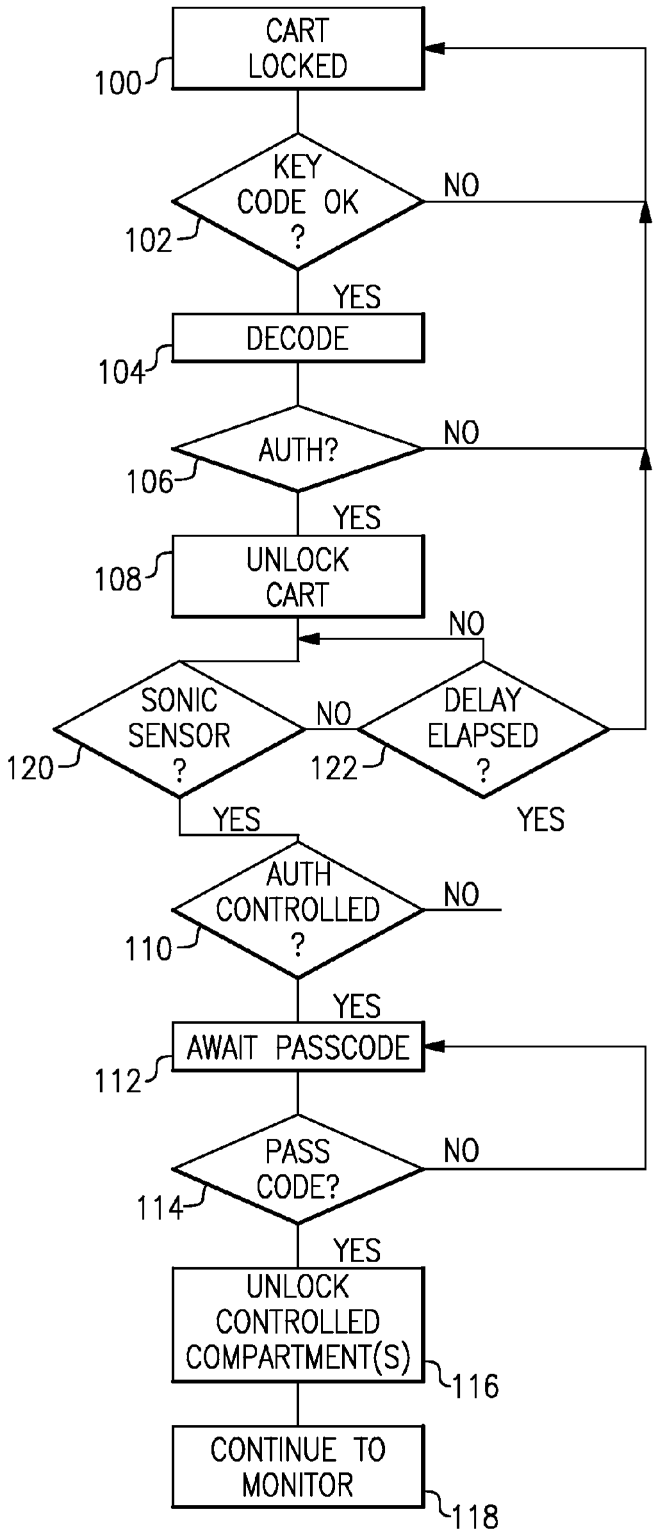
FIG. 4 is a process logic diagram for explaining operation of this embodiment.

The automated access, i.e., locking and unlocking of the anesthesia cart 10 can be explained with reference to the logic chart of FIG. 4.

When the cart 10 is first wheeled into the operating room and plugged in, the cart is in a locked condition, i.e., the drawers 24, 26 etc. are locked, and the electromechanical latches/servos are in the locked position [block 100]. The cart can be unlocked with the coded signals from an authorized proximity key card, when swiped past the proximity sensor on the cart. If a proper coded signal is present [block 102] it is decoded [block 104], and is compared with the authorized code or codes stored in the computer [block 106]. If the code matches one of the authorized unlock codes, the computer actuates the servo motors to unlock the drawers [block 108], or otherwise, the cart remains locked or is re-locked [block 100].

The computer also tests unlock code or key code to compare with special authorization code or codes for access to the bins 62 of the narcotics drawer 24 [step 110]. If the received code is a proper code for access to the narcotics in that drawer 24, then the computer awaits entry of the anesthesiologist's pass code [block 112], and when that is entered [block 114] the computer signals the servo motors in the drawer 24 to unlock the bins and permit access [block 116]. The key card or proximity card is used only for cart access, and does not play a role in maintaining the cart unlocked or in relocking it. The cart system, i.e., the computer 32 and ultrasonic presence sensor 50 continue to monitor for presence of the anesthesiologist, [block 118], and so long as the anesthesiologist is present, and is within the pre-programmed range of the sensor 50, the cart remains unlocked and he or she can continue to access the materials in the cart. As shown as block 120, the sonic sensor 50 continues to monitor for the presence of the user within the volume of its beam within some maximum distance R. As long as the sensor provides a positive confirmation that the user is present, the cart remains unlocked. If the output of the sensor 50 indicates that the user is not present, then the delay timer is started [block 122] and until the delay time (e.g., 60 seconds) has elapsed, the cart remains unlocked. However, after the delay time has elapsed, the system will perform a lock-down of the cart [block 100], and also shut off the ultrasonic sensor. That is, when the anesthesiologist moves outside the range of sensor 50, the cart will automatically relock and reset. When the anesthesiologist returns to the cart, a simple swipe of the key card or proximity card will unlock the drawers, with the exception of the narcotics drawer, but that can be accessed as soon as the anesthesiologist enters his or her pass code or PIN.

In the embodiments of this invention, a significant advantage lies in the cart's feature of automatically and immediately (or after a short programmed time delay) locking out when the user presence is no longer detected. As such, the need for a timed lockout is eliminated. The cart remains open so long as the sensor detects that the user is present. This eliminates the problem of a cart "timing out" and re-locking during a surgical procedure, such as when the operation lasts longer than a timer's set period. There are also instances when the timer's set period can be longer than a surgical operation, which can result in the cart being left unlocked and unattended.

The same arrangement of using continuous access can also be applied to locking medical storage cabinets, which may also be joined together using a daisy-chain i2C communications protocol.

While the invention has been described hereinabove with reference to selected preferred embodiments, it should be recognized that the invention is not limited to those precise embodiments. Rather, many modification and variations would present themselves to persons skilled in the art without departing from the scope and spirit of this invention, as defined in the appended claims.

What is claimed is:

1. An anesthesia cart comprising a cabinet having a base, a front, a rear, and a top;

a computer control arrangement mounted on said cabinet and including a computer processor, a data entry device, and a key code reader mounted in the cabinet and being coupled to said computer processor;

at least one general use drawer in said cabinet including an electro-mechanical lock coupled to said computer processor;

a controlled-materials drawer in said cabinet having a plurality of lockable compartments and having one or more motors for locking and unlocking the plurality of lockable compartments; and a sonic presence sensor mounted on said cabinet and centered thereon, having a beam centered in the direction facing past the front of the cabinet and configured for detecting presence or absence of a user within a given beam volume and within a predetermined range of said sonic presence sensor past the front of said cabinet and providing an output signal indicating the presence or absence of the user to said computer processor, wherein said predetermined range of the given beam volume of said sonic presence sensor is substantially eighteen inches in front of said cabinet and said given beam volume is of sufficient width to detect the user immediately in front of the anesthesia cart;

said key code reader cooperating with said computer control arrangement to communicate with the electro-mechanical lock of said at least one general use drawer and to communicate with a respective motor of the one or more motors of said plurality of lockable compartments, and respond to presence of an anesthesia authorization code to unlock said at least one general use drawer to permit access to said at least one general use drawer; to await entry of an authorized pass code on said data entry device; and, upon entry of said authorized pass code, to unlock one of the plurality of lockable compartments in said controlled-materials drawer; and said computer processor being suitably programmed and configured to maintain the at least one general use drawer in an unlocked condition so long as said sonic presence sensor provides said output signal indicating that the user is present within said given beam volume, and to re-lock said at least one general use drawer and to re-lock the respective lockable compartment of said controlled-materials drawer in response to the output signal of said sonic presence sensor indicating that the user is absent from said given beam volume.

2. The anesthesia cart according to claim 1 wherein said controlled-materials drawer is configured as a pull out drawer slidably supported in the cabinet; the plurality of lockable compartments in the pull out drawer are arranged in at least one pair of rows in a given direction across said pull out drawer and include an elongated covered channel portion extending in said given direction alongside and between said rows of said at least one pair of rows of said plurality of lockable compartments;

each of the plurality of lockable compartments having a compartment lid that is normally locked down but is selectively releasable to permit the compartment lid to open for access to the lockable compartment;

a slide bar disposed in said elongated covered channel portion and suitably configured to move for at least a limited distance along said elongated covered channel portion, and arranged to slide to a plurality of predetermined positions, each position unlocking only a respective one of the plurality of compartment lids and leaving the remaining compartment lids locked; and a respective motor of the one or more motors for moving said slide bar to a selected one of the plurality of predetermined positions to permit only one said compartment lid to be lifted open.

3. The anesthesia cart according to claim 1 wherein said sonic presence sensor is an ultrasonic range finder.

4. The anesthesia cart according to claim 1 wherein said computer control arrangement is suitably programmed and configured to observe a predetermined delay time when the output signal of the sonic presence sensor indicates that the user is absent from said given beam volume, and to maintain the at least one general use drawer in its unlocked condition until said predetermined delay time has expired.

5. A medications and medical supplies cart comprising a cabinet having a base, a top, a back, and a front;

a computer control arrangement mounted on said cabinet and including a computer processor, a key code reader mounted in the cabinet and being coupled to said computer processor;

at least one general use compartment in said cabinet including an electro-mechanical lock mechanism coupled to said computer processor; and means for communicating an unlock code to said key code reader;

said key code reader cooperating with said computer control arrangement to communicate with the electro-mechanical lock mechanism of said at least one general use compartment, and respond to presence of said unlock code to unlock said at least one general use compartment to permit access to said at least one general use compartment; and a sonic presence sensor mounted on said cabinet and centered thereon, having a beam centered on the front of the cabinet in the direction past the front of the cabinet, and operative to detect presence of a user within a given beam volume of the sonic presence sensor extending for a predetermined distance in front of the cabinet, providing an output signal that indicates that the user is present in said given beam volume and providing another output signal that indicates the user is absent from said given beam volume, wherein said predetermined distance of the given beam volume is substantially eighteen inches in front of said cabinet and the given beam volume is of sufficient width to detect the user immediately in front of the medications and medical supplies cart;

the computer control arrangement being operative, when the output signal of the sonic presence sensor indicates the user is present in said given beam volume to maintain said at least one general use compartment in an unlocked state, and when the output signal of said sonic presence sensor indicates that the user is absent from said given beam volume to re-lock said at least one general use compartment.

6. The medications and medical supplies cart according to claim 5, wherein said sonic presence sensor is an ultrasonic range finder.

7. The medications and medical supplies cart according to claim 5, wherein said computer control arrangement is suitably programmed and configured to observe a predetermined delay time when the output signal of the sonic presence sensor indicates that the user is absent from said given beam volume, and to maintain the at least one general use compartment in its unlocked state until said predetermined delay time has expired.

* * * * *